(12) United States Patent
Wagner

(10) Patent No.: US 8,823,498 B2
(45) Date of Patent: Sep. 2, 2014

(54) TRANSCEIVER

(75) Inventor: Martin Wagner, Norderstedt (DE)

(73) Assignee: NXP B.V., Eindhoven (NL)

( * ) Notice: Subject to any disclaimer, the term of this patent is extended or adjusted under 35 U.S.C. 154(b) by 632 days.

(21) Appl. No.: 12/899,380

(22) Filed: Oct. 6, 2010

(65) Prior Publication Data

US 2011/0080269 A1    Apr. 7, 2011

(30) Foreign Application Priority Data

Oct. 6, 2009    (EP) ..................................... 09252366

(51) Int. Cl.
*G05B 11/01*    (2006.01)
*H04L 12/40*    (2006.01)

(52) U.S. Cl.
CPC . *H04L 12/40039* (2013.01); *H04L 2012/40273* (2013.01); *H04L 12/40032* (2013.01)
USPC ..................................................... 340/12.31

(58) Field of Classification Search
CPC ........... H04B 1/205; H04B 3/54; G08C 19/30
USPC ........ 340/10.33, 5.61, 12.52, 12.31; 327/198; 375/219, 222; 307/10.1
See application file for complete search history.

(56) References Cited

U.S. PATENT DOCUMENTS

| | | | |
|---|---|---|---|
| 5,838,747 A * | 11/1998 | Matsumoto .................... | 375/370 |
| 6,438,462 B1 | 8/2002 | Hanf | |
| 6,519,720 B1 | 2/2003 | Mores | |
| 6,674,762 B2 * | 1/2004 | Mores et al. .................. | 370/421 |
| 2002/0140292 A1 | 10/2002 | Stierle et al. | |
| 2004/0145500 A1 | 7/2004 | Huebl | |
| 2005/0160301 A1 | 7/2005 | Disser | |

FOREIGN PATENT DOCUMENTS

WO    2006/003540 A1    1/2006

OTHER PUBLICATIONS

Extended European Search Report for Patent for Patent Appln. EP09252366.1 (Mar. 22, 2010).

* cited by examiner

*Primary Examiner* — Vernal Brown

(57) ABSTRACT

A transceiver includes a transmit pin configured to receive a signal from a microcontroller, a receive pin configured to transmit a signal to a microcontroller and a bus pin configured to transmit and receive signalling to/from a network. The transceiver also includes a wake-up detector for selectively waking up the microcontroller connected to the transceiver, and one or more switches operable to put the transceiver in a first mode of operation. In the first mode of operation, the transmit pin is connected to the wake-up detector, and the wake-up detector is configured to activate a wake-up code in accordance with a signal received at the transmit pin.

13 Claims, 5 Drawing Sheets

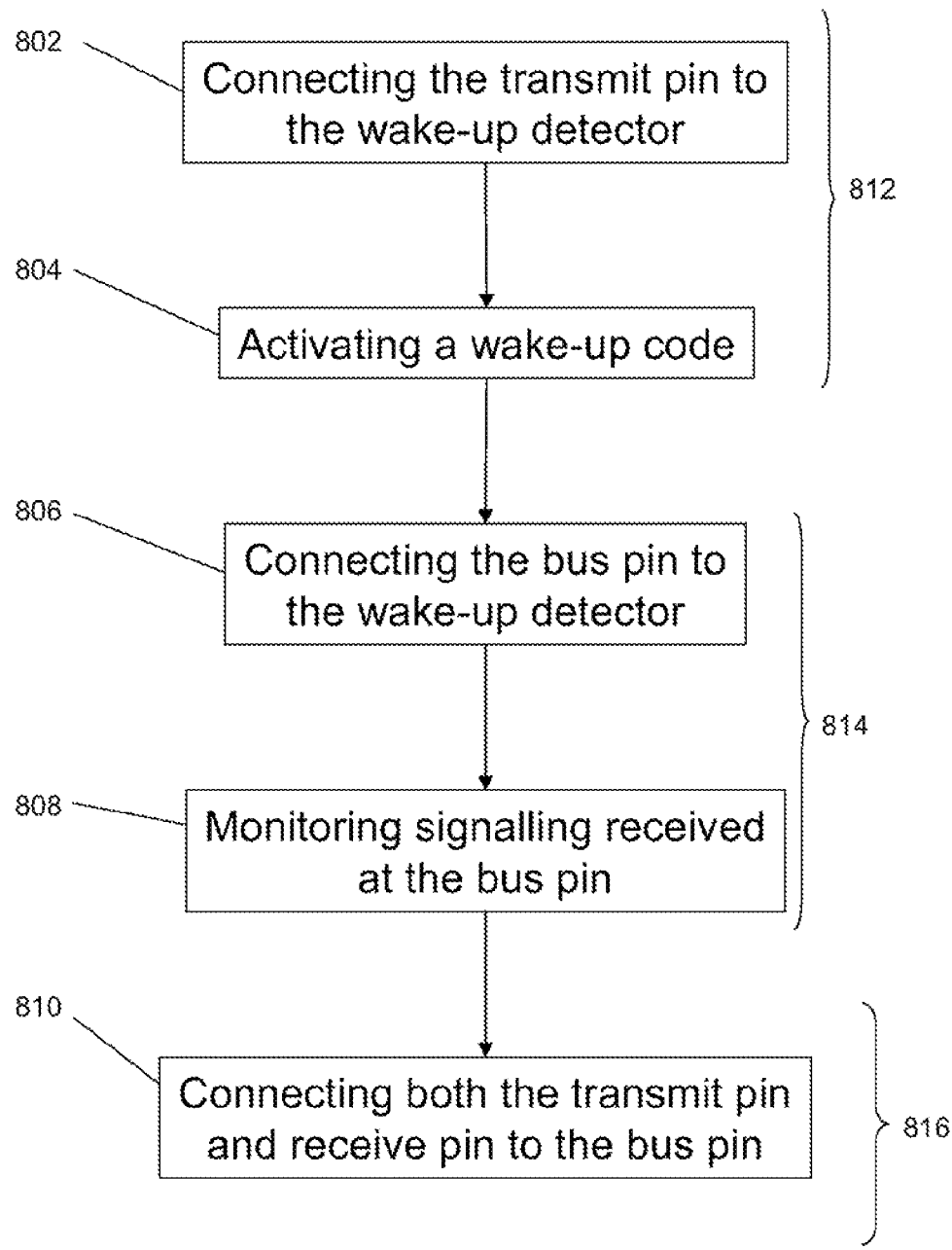

TRANSCEIVER

This application claims the priority of European patent application no. 09252366.1, filed on Oct. 6, 2009, the contents of which are incorporated by reference herein.

BACKGROUND OF THE INVENTION

Automotive bus transceivers normally provide a simple interface for mode control of a device/microcontroller in a network. Such devices/microcontrollers can include door control units, dashboard controllers, etc. A typical standard transceiver makes use of up to two dedicated mode control pins, and this means that there are usually not more than four different states of operation.

More complex interfaces, such as I2C and SPI, are known to increase the number of control modes for a device. Also, it is known to add additional dedicated mode control pins in excess of the typical two control pins. Disadvantages associated with these examples can include a more expensive device that is incompatible with earlier devices, and this means that such a new transceiver may not be provided as a drop-in replacement for known transceivers.

The listing or discussion of a prior-published document or any background in the specification should not necessarily be taken as an acknowledgement that the document or background is part of the state of the art or is common general knowledge.

SUMMARY OF THE INVENTION

According to a first aspect of the invention, there is provided a transceiver comprising:
a transmit pin configured to receive a signal from a microcontroller;
a receive pin configured to transmit a signal to a microcontroller;
a bus pin configured to transmit and receive signalling to/from a network;
a wake-up detector; and
one or more switches operable to put the transceiver in a first mode of operation;
wherein, in the first mode of operation, the transmit pin is connected to the wake-up detector, and the wake-up detector is configured to activate a wake-up code in accordance with a signal received at the transmit pin.

In this way, the wake-up detector of the transceiver can be configured in accordance with signals received at the transmit pin on a device-side of the transceiver. Configuring the transceiver in accordance with a signal received at the device-side of the transceiver as opposed to the network-side of the transceiver can take advantage of a less noisy signal for configuration purposes. This can lead to a more robust transceiver, with an improved accuracy of detecting wake-up signals on a network. Such examples are useful for selective wake-up operations, and can enable different operating modes to be achieved by a transceiver that has the same pin layout as existing transceivers.

BRIEF DESCRIPTION OF THE DRAWINGS

A description is now given, by way of example only, with reference to the accompanying drawings, in which:
FIG. 8 illustrates schematically a method according to an embodiment of the invention.

DETAILED DESCRIPTION

Figure 1:
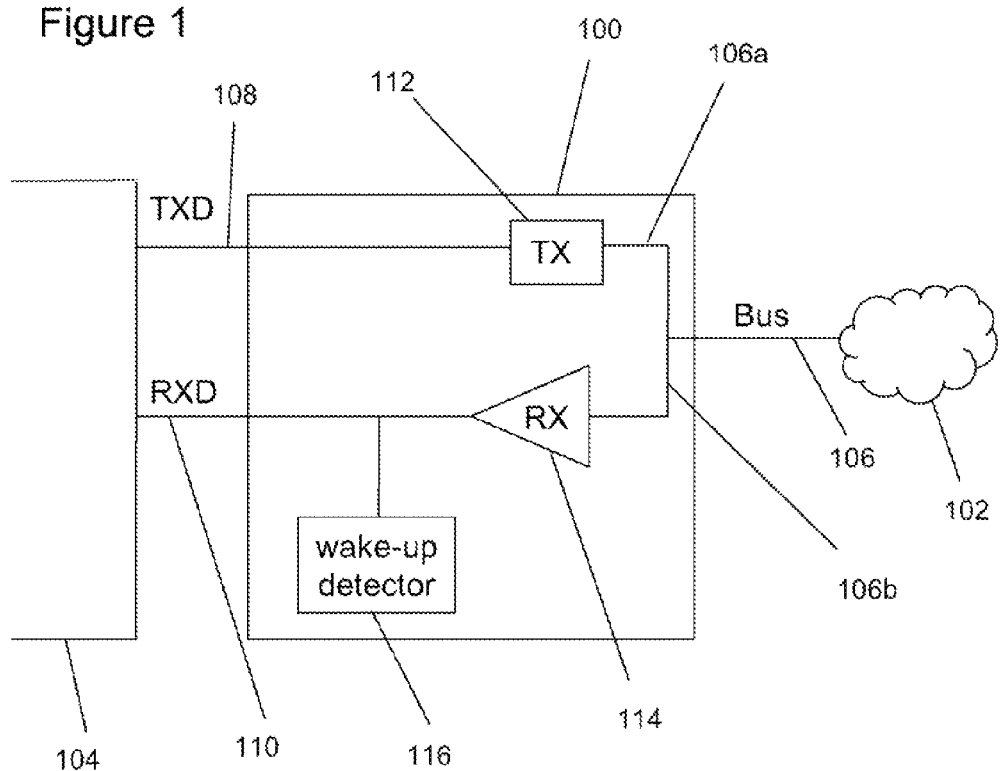
FIG. 1 illustrates a prior art transceiver.

In some embodiments, the transceiver may comprise two bus pins, or any other number of bus pins. It will be appreciated that the number of bus pins may be dependent upon the type of network that is being used. For example, CAN and FlexRay networks are dual wire bus systems, whereas LIN or Single-wire CAN have a single bus wire.

The one or more switches may be further operable to put the transceiver in a second mode of operation, and, in the second mode of operation: the wake-up detector is connected to the bus pin; and the wake-up detector is configured to monitor signalling received at the bus pin in order to identify the activated wake-up code. The second mode of operation may be considered as a scanning/monitoring mode of operation in which signals on the network are monitored for the wake-up code that was activated in the first mode of operation.

The wake-up detector may be configured to cause the transceiver to enter a third mode of operation upon identifying the activated wake-up code; wherein, in the third mode of operation, the transmit pin and receive pin are both connected to the bus pin. The third mode of operation may be considered as a "normal" operation mode, in which the device can communicate with the network via the transceiver. The transition to the third mode of operation may be a direct or indirect transition. After the transceiver receives one of the selected wake-up codes, it can set the receive pin (RXD) to a LOW level in order to perform a "standard wake-up". In examples where the transceiver includes an IHN pin, this pin can be switched on to activate the power supply of the microcontroller.

The transceiver may be configured to change from the third mode of operation to the first or second mode of operation upon receipt of a "go to sleep" signal. The "go to sleep" signal may be received from the standard control pins of the transceiver. The transceiver may return to the first mode of operation in order to reconfigure the wake-up detector and provide a robust transceiver, although in other embodiments this may be considered unnecessary.

In the first mode of operation, the transmit pin may not be connected to the bus pin, and this can ensure that any configuration signals that are provided by the device to the transceiver are not also provided to the network. When in use, signals at the transmit pin may not be forwarded to the bus pin/s.

The transceiver may be configured to change from the first mode of operation to a second mode of operation after a wake-up code has been activated. In other examples, the transceiver may be configured to change from the first mode of operation to the second mode of operation after a predetermined period of time.

The transceiver may further comprise a data rate detector and an oscillator, wherein, in the first mode of operation, the data rate detector is configured to process a signal from the transmit pin and a signal from the wake-up detector and generate a timing signal that is configured to adjust one or more parameters of the oscillator in accordance with the signal received at the transmit pin. In this way, the internal timing characteristics of the transceiver can be brought into line with those on the network without having to directly determine a data rate of signals on the network. That is, signals received from the device-side of the transceiver can be used to configure timing parameters of the oscillator/transceiver.

The transmit pin, receive pin and bus pin may be standard pins. This can mean that the transceiver can replace existing transceivers in networks without having to reconfigure any external connections.

In the first mode of operation, the transmit pin may be connected to the receive pin. This can be advantageous and in some embodiments enable correct operation of a protocol engine inside of the device, thereby enabling the bits which are sent out by the device to be read back.

In the second mode of operation, the transmit pin may not be connected to the wake-up detector.

The wake-up detector may be configured to activate a wake-up code by identifying a wake-up code in memory that corresponds to a wake-up code represented by the signal received at the transmit pin. The memory may comprise a plurality of potential wake-up codes, and the plurality of wake-up codes may be selected so that they are easily distinguishable from each other and/or easily distinguishable at different bit rates, for example if a local oscillator associated with the wake-up detector is not configured correctly. Such embodiments may further improve the robustness of the transceiver when identifying and activating wake-up codes.

There may be provided an integrated circuit comprising any transceiver disclosed herein.

There may also be provided a network comprising:
one or more devices;
a transceiver connected to the one or more devices; and
a data bus connecting the one or more transceivers;
wherein the transceiver/s are according to any one of claims, and the transmit and receive pins of the transceiver are connected to one of the devices and the bus pin is connected to the data bus.

The network may be a CAN network, a LIN network or a FlexRay network, for example.

There may be provided an automobile comprising any transceiver or network disclosed herein.

According to a further aspect of the invention, there is provided a method of operating a transceiver, the transceiver comprising:
a transmit pin configured to receive a signal from a microcontroller;
a receive pin configured to transmit a signal to a microcontroller;
a bus pin configured to transmit and receive signalling to/from a network;
a wake-up detector; and
one or more switches operable to put the transceiver in a first mode of operation;
the method comprising:
connecting the transmit pin to the wake-up detector; and
activating a wake-up code in accordance with a signal received at the transmit pin.

The method may further comprise one or more of the following steps: connecting the bus pin to the wake-up detector; and monitoring signalling received at the bus pin in order to identify the activated wake-up code. The method may comprise connecting the receive pin to the bus pin, and possibly not connecting the transmit pin to the bus pin. In this state, the transceiver can be in a low power mode. The microcontroller/device may be deactivated, and therefore no signal is received by the transceiver at the transmit pin. The transceiver can then listen to/monitor bus communication and wake-up the microcontroller upon receiving one of the wake-up messages that are activated by the configuration.

The method may further comprise connecting both the transmit pin and receive pin to the bus pin upon identifying the activated wake-up code. This may be considered as waking up the microcontroller/device and taking it out of a low power mode.

According to a further aspect of the invention there is provided a computer program, which when run on a computer, causes the computer to configure any apparatus, including a transceiver, circuit or network, disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium such as a disc or a memory device, or may be embodied as a transient signal. Such a transient signal may be a network download, including an internet download.

One or more embodiments described herein relate to a transceiver for connecting a device/microcontroller to a network, such as a network in an automobile. The transceiver can have a first mode of operation to configure the transceiver so that a device connected to the transceiver can be selectively woken up. It will be appreciated that "selectively woken up" can mean that the device can be woken up independently of other devices on the network.

There may be provided a bus transceiver that can be configured through its communication interface. One or more embodiments can use the standard serial communication pins of the transceiver (TXD and RXD) in a new way for configuring the transceiver, such as for configuring a selective wake-up code and/or configuring timing information.

Using the standard serial communication pins can mean that the transceiver is compatible with existing devices and/or networks. In addition, a transceiver described herein can utilise configuration data received at its device-side interface for configuring a selective wake-up detector. This can take advantage of signals that are less noisy than those on the network-side of the transceiver, and therefore can enable a more reliable transceiver to be provided. The less noisy signals on the device-side of the transceiver can be provided to a wake-up detector using a bypass switch, depending upon the mode of operation.

FIG. 1 shows schematically a prior art transceiver 100. The transceiver 100 is connected to a network 102 by a data bus 106 on a network-side of the transceiver 100, and is connected to a device/microcontroller 104 on a device-side side of the transceiver 100. The transceiver 100 is connected to the device 104 by a transmit pin 108 (TXD) and a receive pin 110 (RXD).

Within the transceiver 100, the data bus 106 is split into two branches: a first branch 106*a* that is provided to a transmitter component 112 (TX) which in turn is connected to the transmit pin 108 (TXD); and a second branch 106*b* which is provided to a receive component 114 (RX) which in turn is connected to the receive pin 110 (RXD).

The transceiver 100 also includes a wake-up detector component 116 that is coupled to the output of the receiver component 114 (RX). The wake-up detector 116 is configured to monitor signals received from the network 102 on the data bus 106, and cause the device 104 to wake-up when any signal is detected on the data bus 106.

The prior art transceiver 100 includes two control pins: STBN and EN, which control the mode of operation of the transceiver as follows. It will be appreciated that the control via STBN and EN is used as an example for prior art transceivers, and that other interfaces like SPI can be used for devices with a higher level of integration (so-called System Basis Chips).

Both control pins are digital control pins that can be directly connected to two general purpose pins of the microcontroller 104. If STBN and EN are both set to a HIGH level, then the transceiver 100 is in the so-called Normal Mode. In Normal Mode, a signal received at the transmit pin 108 (TXD) is directly forwarded to the bus pin 106, a signal received at the bus pin 106 is forwarded to the receive pin 110 (RXD) so that normal communication between the microcontroller 104 and the bus 106 is possible.

If the STBN and EN control pins are both set to a LOW level, the transceiver enters the so-called Standby Mode. In Standby Mode, the transmitter is disabled so that a signal received at the transmit pin 108 (TXD) is not forwarded to the bus pin 106. Also a signal received at the bus pin 106 is not directly forwarded to the receive pin 110 (RXD) but to the wake-up detector 116. The microcontroller 104 is then normally in a low power mode to reduce current consumption of the module. If the wake-up detector 116 recognizes a wake-up signal, then a LOW level signal is provided to the receive pin 110 (RXD), and this causes the microcontroller 104 to awake. The microcontroller 104 can then activate Normal Mode by setting the STBN and EN control pins HIGH, and therefore start communication between the microcontroller 104 and network 102.

If the STBN control pin is LOW and the EN control pin is HIGH, then the transceiver 100 enters the so-called Sleep Mode. The Sleep Mode is different to the Standby Mode as the transceiver 100 also disables the power supply of the microcontroller 104 (via a so-called INH pin for example) in the Sleep Mode. However, the wake-up mechanism is the same as for the Standby Mode.

Finally, if the STBN pin is HIGH and the EN pin is LOW, then a Special Mode is entered that can allow reading of a certain flag from the transceiver. Different transceivers can have different Special Modes that are outside the scope of this document.

It will be appreciated that transceivers are available that just provide a Normal and a Standby Mode, and this can mean that only one pin for configuration is required.

Figure 2:
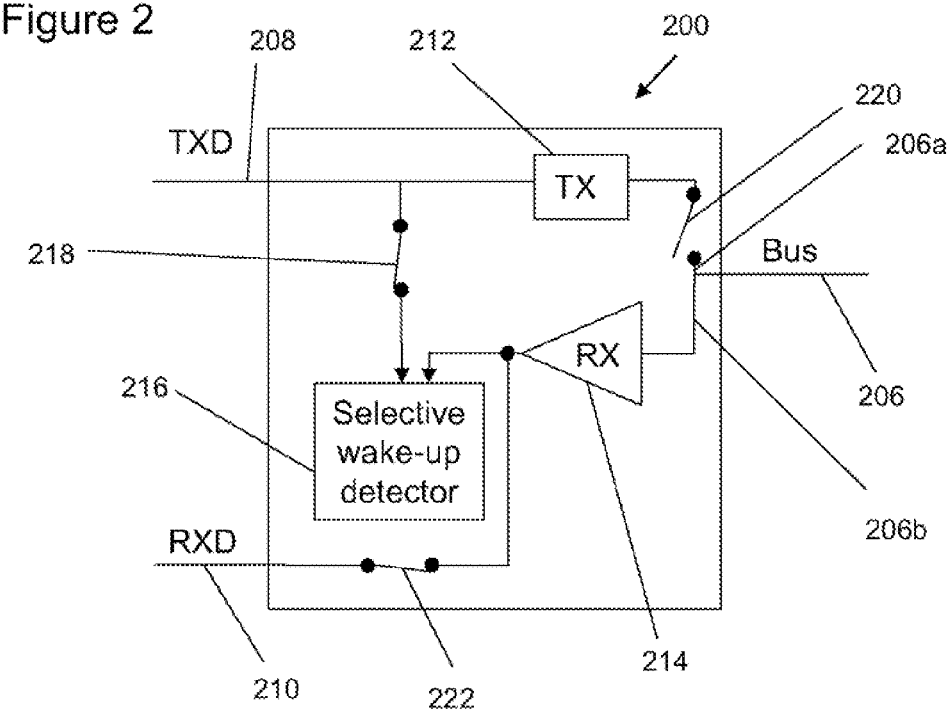
FIG. 2 illustrates a transceiver according to an embodiment of the invention in a first mode of operation.
Figure 3:
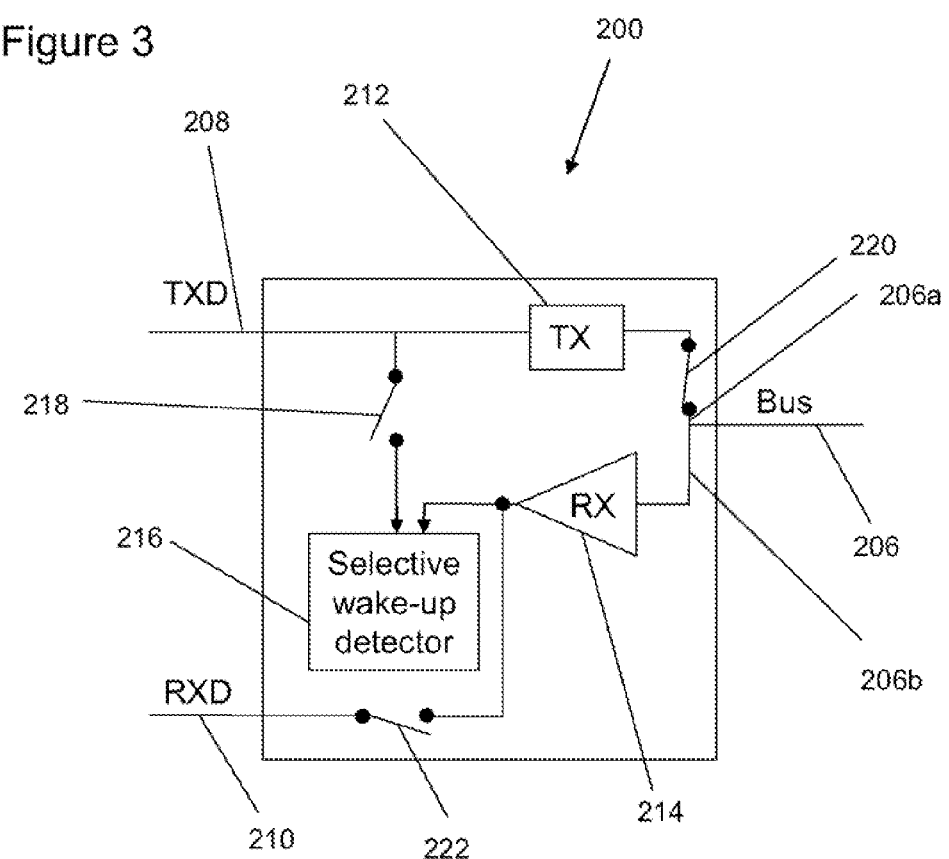
FIG. 3 illustrates the transceiver of FIG. 2 in a second mode of operation.
Figure 4:
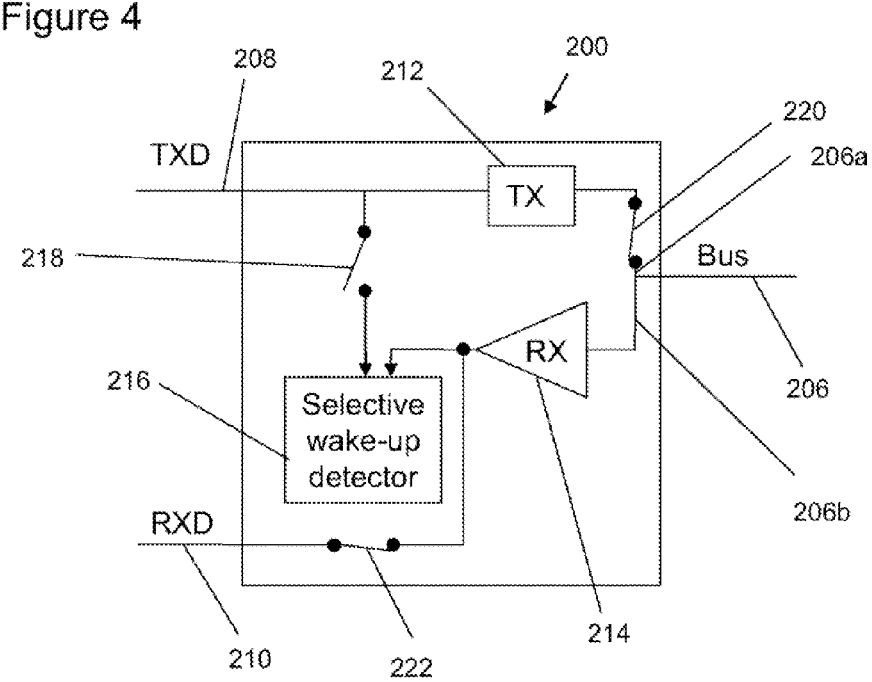
FIG. 4 illustrates the transceiver of FIGS. 2 and 3 in a third mode of operation.

FIGS. 2 to 4 illustrate an embodiment of a transceiver 200 according to an embodiment of the invention. FIG. 2 shows the transceiver 200 in a first mode of operation, FIG. 3 shows the transceiver 200 in a second mode of operation, and FIG. 4 shows the transceiver 200 in a third mode of operation. As will be appreciated from the following description, the different modes of operation shown in FIGS. 2 to 4 relate to one or more of the switches being in different positions in accordance with signals received at control pins STBN and EN (not shown), thereby operably connecting and disconnecting certain components/pins of the transceiver 200 with other components/pins of the transceiver 200.

It will be appreciated that the switches and blocks shown in the figures should be understood as signal routing diagrams, rather than real circuit diagrams.

The transceiver 200 comprises a data bus pin 206 for connecting to a network (not shown). The transceiver 200 also comprises a transmit pin 208 (TXD) and receive pin 210 (RXD) for connecting to a device (not shown). The device may also be known as a microcontroller. The transmit pin 208 (TXD) is configured to receive a signal from the device and the receive pin 210 (RXD) is configured to transmit a signal to the device. Similarly, the bus pin 206 is configured to transmit and receive signalling to and from the network.

The bus pin 206 is connected within the transceiver 200 such that it splits into a transmit branch 206a and receive branch 206b. The transmit pin 208 (TXD) is connected to a transmit component 212, and the transmit component 212 is in turn connected to the transmit branch 206a via a first switch 220. The receive branch 206b is connected to a receive component 214, which in turn is connected to the receive pin 210 (RXD) by a second switch 222. The output of the receive component 214 is also connected to a selective wake-up detector 216. In addition, the transmit pin 208 (TXD) is connectable to the selective wake-up detector 216 by a third switch 218.

Operation of the switches 220, 222, 218 and corresponding data flow through the transceiver 200 will now be described with reference to FIGS. 2 to 4 which illustrate first, second and third modes of operation of the transceiver 200 respectively. It will be appreciated that in other embodiments, the switches could be located at different locations and/or a different number of switches an be provided that provide the required functionality of operably connecting and disconnecting components and pins within the transceiver 200 in accordance with the mode of operation of the transceiver 200.

The first mode of operation shown in FIG. 2 may be referred to as a configuration mode of operation. In the first mode of operation the selective wake-up detector 216 is configured for subsequently being capable of performing selective wake-up of the associated device. As shown in FIG. 2, the first switch 220 is open, the second switch 222 is closed, and the third switch 218 is closed.

In the first mode of operation, the STBN control pin can be set to a HIGH level, and the EN control pin can be set to a LOW level. It will be appreciated that, the specific values assigned to the STBN and EN control pins are not limiting, and can be different for different embodiments. In some embodiments, it can be considered an advantage that the signals that are required by the STBN and EN control pins are the same as for known transceivers, and therefore a transceiver 200 according to an embodiment of the invention can conveniently be used to replace existing transceivers without having to rewire components associated with the transceiver 200.

During the first mode of operation, a signal is received at the transmit pin 208 (RXD) from the associated device and is provided to the selective wake-up detector 216 via third switch 218. As an example, the device may transmit a configuration signal representative of one of a plurality of wake-up codes that are stored in a memory associated with the selective wake-up detector 216 so that the selective wake-up detector can activate a specific code. In such an embodiment, the selective wake-up detector 216 can compare a signal received at the transmit pin 208 (TXD) with fixed patterns/codes stored in memory in order to identify an intended wake-up code. Identifying the wake-up code can involve activating the wake-up code for subsequent use in the second and third modes of operation as discussed below.

Having a predetermined list of wake-up codes associated with the selective wake-up detector 216 can reduce the likelihood that the wake-up code is misrecognised, and the wake-up codes can be selected so that they are easy to distinguish from each other and/or easy to detect irrespective of the bit rate of the received signal. Such an example can improve the accuracy of the wake-up functionality provided by the transceiver 200.

In another example, the selective wake-up detector may use the configuration signal received by the transceiver 200 at transmit pin 208 (TXD) to directly activate a wake-up code represented by the configuration signal. That is, the configuration signal may not necessarily represent one of a set of predetermined codes associated with the wake-up detector 216, and could represent any sequence of information bits/data that comprises any wake-up code.

An advantage provided by the transceiver 200 can be that a configuration signal received at the transmit pin 208 (TXD) is used to activate a wake-up code, which is in contrast to using a configuration signal received at the network-side bus pin 206 of the transceiver 200. Embodiments of the invention can utilise the recognition that signals received on the device-side of the transceiver 200 are less noisy, and therefore more accurate, than signals received on the network-side of the transceiver. This can be due, at least in part, to a shorter communication channel and therefore exposure to less electromagnetic interference (EMI) than those signals that have travelled around the network.

In addition, the third switch 218 can also provide a link between the transmit pin 208 (TXD) and the receive pin 210 (RXD) within the transceiver 200. The third switch 218 may be referred to as a bypass switch, as it can provide a bypass between the transmit pin 208 (TXD) and receive pin 210 (RXD). In this way, a signal received at the transmit pin 208 (TXD) is provided to the receive pin 210 (RXD) in order to enable correct operation of a protocol engine inside of the microcontroller, thereby enabling the bits which are sent out by the device to be read back.

The transceiver 200 described herein can be considered as a "Partial Networking" transceiver having a wake-up detector that is more intelligent than the prior art. Although the transceiver 200 may not be able to "understand" communication received at the bus pin 206, it may be able to distinguish a certain set of (fixed) wake-up messages from normal communication. Therefore, the wake-up detector may be considered as a "selective wake-up detector" or "intelligent wake-up detector", as opposed to a "standard wake-up detector" of the prior art.

In the embodiment of FIG. 2, the first switch 220 is open so that the signals received at the transmit pin 208 (TXD) are not passed to the bus pin 206 and hence onto the network, thereby reducing the chances that the new type of configuration signals that are provided at the transmit pin 208 (TXD) do not disturb bus traffic on the network; that is, outside of the transceiver model 200. In other embodiments, the device can send any new configuration function/signal to the transceiver 200 by the transmit pin 208 (TXD), or can send a special wake-up message or any other configuration data directly to the selective wake-up detector 216. The selective wake-up detector 216 can then be used to store the message in the transceiver's 200 internal memory (not shown), or at least derive dedicated configuration bits out of the received and decoded message.

In some embodiments, the selective wake-up detector 216 may receive signals from both the transmit pin 208 (TXD) and the bus pin 206. On the one hand the selective wake-up detector 216 may be able to listen to/monitor signals from either the transmit pin 208 (TXD) or the bus pin 206, but not on both at the same time. On the other hand, the transceiver 200 should not be blind to signals received on the bus pin 206 during configuration in the first mode of operation. Therefore, it can be advantageous to have a connection between the bus pin 206 and the wake-up detector 216 during the configuration mode in the first mode of operation.

In one example, this situation can be addressed by providing two wake-up detectors 216: one for receiving signal from the transmit pin 208 (TXD); and one for receiving signals from the bus pin 206. In such examples, the two wake-up detectors 216 may be provided with only the functionality that they require for processing the signals that they receive. That is, the wake-up detector 216 that receives signals from the transmit pin 208 (TXD) may not have the functionality for processing signals received from the bus pin 206, and vice versa. This can enable the wake-up detector 216 that is configured for processing signals from the transmit pin 208 (TXD) to be less complex than the other wake-up detector 216.

Another example can include a wake-up detector 216 that provides synchronization between signals received at the transmit pin 208 (TXD) and the bus pin 206.

After a wake-up code has been activated by the selective wake-up detector 216, the transceiver enters the second mode of operation.

FIG. 3 shows the transceiver 200 in the second mode of operation. The second mode of operation may be referred to as a standby/scanning mode of operation, because the transceiver is scanning signals received at the bus pin 206 and is awaiting a wake-up signal representative of an instruction to wake-up the associated device. In a similar way to the standby mode of operation discussed in relation to FIG. 1, the STBN and EN control pins can be set to a low level by the microcontroller when the transceiver 200 is to enter the second mode of operation.

In the second mode of operation, the first switch 220 is closed, the second switch 222 is open, and the third switch 218 is open. In this way, the transmit pin 208 (TXD) is disconnected from the selective wake-up detector 216, whereas the output of the receive component 214 is connected to the selective wake-up detector 216 such that signals received at the bus pin 206 are provided to the selective wake-up detector 216.

The second switch 222 is open so that the device cannot receive data from the network as the receive branch 206b is not complete. It will be appreciated that this is indicative of the device being in a sleep mode.

During the second mode of operation, the selective wake-up detector 216 monitors data received from the network at the bus pin 206 in order to identify a signal representative of the wake-up code that was activated during the first mode of operation. Upon the selective wake-up detector 216 identifying the activated wake-up code, the selective wake-up detector 216 is configured to cause the transceiver to enter the third mode of operation.

The transceiver 200 can be caused to enter the third mode of operation by initially setting a signal at the receive pin 210 (RXD) low, and optionally enabling a power supply to the microcontroller if required. This provides an indication to the microcontroller that it should be woken up. In a similar way to that discussed with reference to FIG. 1 above, the transceiver can cause the device to set the STBN and EN control pins to a HIGH level, so that the transceiver 100 is put in the so-called Normal Mode.

As shown in FIG. 4, during the third mode of operation, the first switch 220 is closed, the second switch 222 is closed, and the third switch 218 is open. The third mode of operation may be referred to as a normal mode of operation because the device is in communication with the network in the "normal" way.

The third switch 218 is open so that the transmit pin 208 is not connected to the selective wake-up detector 216, and the first switch 220 is closed so that the transmit pin (TXD) 208 is connected to the bus pin 206 in the normal way. In addition, the second switch 222 is closed so that the receive pin (RXD) 210 is also connected to the bus pin 206 in the normal way. During the third mode of operation, the selective wake-up detector 216 is disabled.

When a signal is provided to the microcontroller representative of an indication that the device should go to sleep, the device sets the STBN and EN control pins to appropriate values so that the transceiver 200 enters either the first or second mode of operation.

In examples where the transceiver 200 enters the first mode of operation on receipt of a "go to sleep" instruction, the specific wake-up code for the device in question can be reconfirmed by the device as it sends another configuration signal to the transmit pin 208 (TXD) of the transceiver 200. This can reduce the likelihood that the wake-up codes that are expected on the device-side of the transceiver 200 and the network-side of the transceiver 200 become inconsistent. It will be appreciated that an advantage associated with entering the first mode of operation after the third mode of operation is that a more robust transceiver can be provided.

In other examples, it may be considered unnecessary to re-enter the first mode of operation after the third mode of operation, and the transceiver 200 can simply re-enter the second/scanning mode of operation to monitor for subsequent wake-up signals. In this way, the first mode of operation may be entered less frequently, for example only during start up or periodically after the expiry of a certain period of time since the last occasion that the transceiver 200 was in the first mode of operation.

Figure 5:
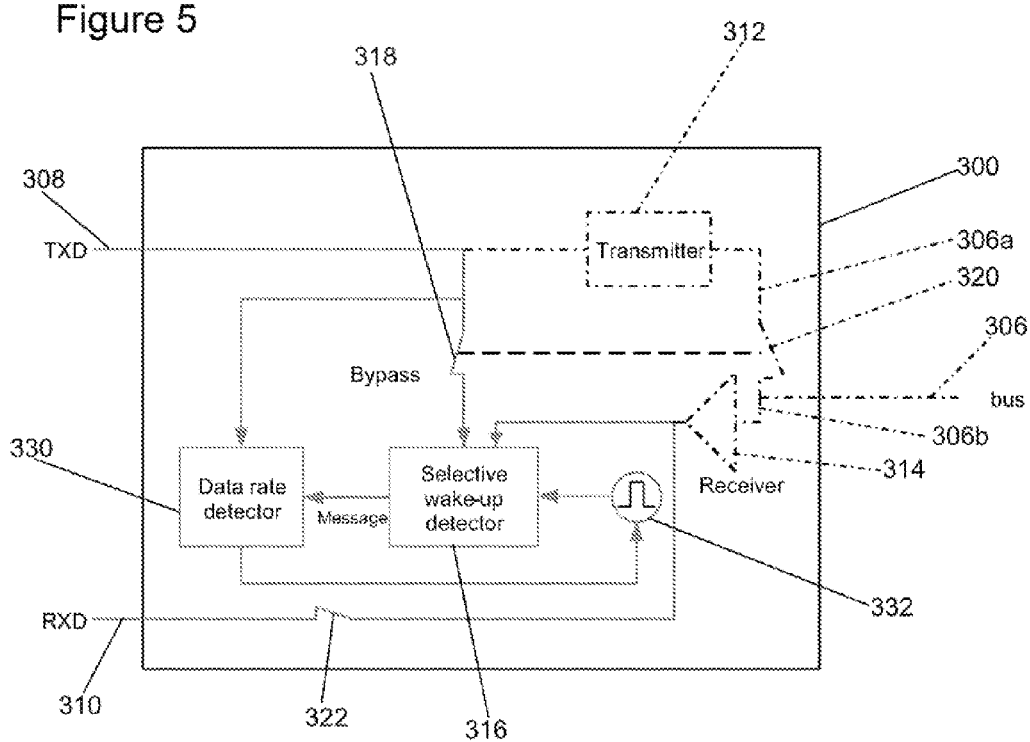
FIG. 5 illustrates a transceiver according to a further embodiment of the invention in a first mode of operation.
Figure 6:
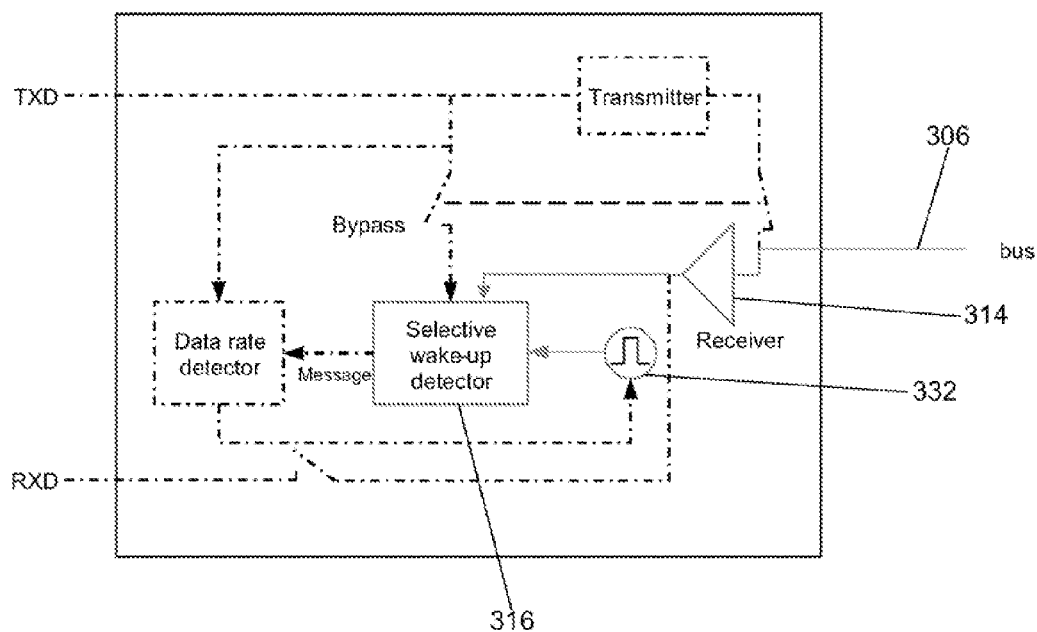
FIG. 6 illustrates the transceiver of FIG. 5 in a second mode of operation.
Figure 7:
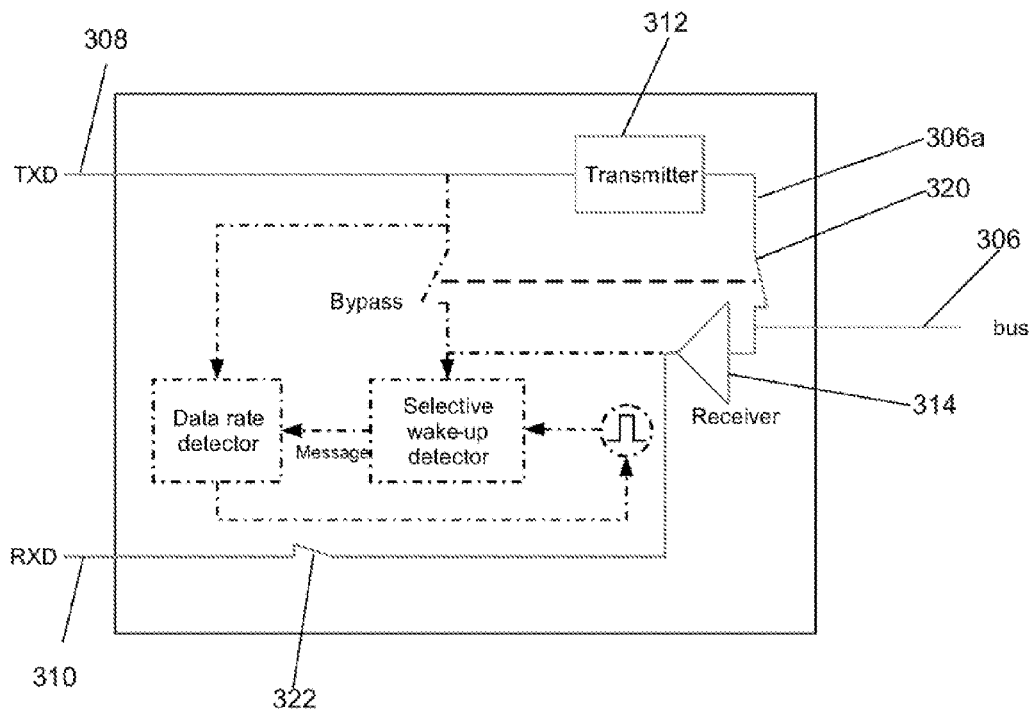
FIG. 7 illustrates the transceiver of FIG. 5 in a third mode of operation.

FIGS. 5 to 7 illustrate a transceiver 300 according to another embodiment of the invention, and illustrate the transceiver 300 in a first, second and third mode of operation respectively.

The transceiver 300 shown in FIGS. 5 to 7 is configured such that its timing information and selective wake-up codes can be configured through a communication interface (the transmit and receive pins 308, 310) with an associated device/microcontroller.

The transceiver 300 shown in FIGS. 5 to 7 includes a number of switches that can operably connect and disconnect components and/or pins within the transceiver 300 in accordance with a mode of operation of the transceiver 300. Those links between components and/or pins of the transceiver 300 that are not in use for any particular mode of operation are shown as dot-dash lines, whereas links through which signals are conducted are shown as solid lines.

Components of the transceiver 300 of FIGS. 5 to 7 that are similar to the transceiver 200 of FIGS. 2 to 4 have corresponding reference numbers in the 300 series. In addition to the components of the transceiver 200 of FIGS. 2 to 4, the transceiver 300 of FIGS. 5 to 7 also includes an oscillator/clock 332 and a data rate detector 330.

As shown in FIG. 5, a signal received at the transmit pin 308 (TXD) is provided as an input to the data rate detector 330 when the transceiver 300 is in the first mode of operation. The first mode of operation can also be considered as a configuration mode of operation. In this embodiment, the "configuration" consists of both configuring timing information for the transceiver 300, and activating a wake-up code associated with the selective wake-up detector 316. Activating the wake-up code is performed in a similar way to that described with reference to FIG. 2.

When the transceiver 300 is in the first mode of operation as shown in FIG. 5, a configuration signal received by the selective wake-up detector 316 is used to activate a wake-up code. The activated wake-up code as determined by the selective wake-up detector 316 is also provided as an input to the data rate detector 330 along with the configuration signal received at the transmit pin 308 (TXD). The data rate detector 330 can then compare the activated wake-up code with the actual signal received at the transmit pin 308 (TXD) to determine the data rate that is being used by the device connected to the transmit pin 308 (TXD).

As discussed above, a signal received from the device-side of the transceiver 300 can be less noisy than a signal received from the network-side of the transceiver 300, and therefore can enable more accurate timing information to be determined. Furthermore, in examples where the activated wake-up code is identified from one of a predetermined list of possible wake-up codes, the accuracy with which the wake-up code can be identified/activated can lead to a further increase in the accuracy of the determined data rate.

The data rate detector 330 generates an output timing signal that is provided to a local oscillator/clock 332 such that the parameters of the local oscillator 332 can be set in accordance with the detected data rate. Parameters of the local oscillator 332 that can be set include adjusting the internal clock so that it matches the actual bitrate in the network (or a rational portion of the bitrate). Knowing the bitrate of the bus system can help the selective wake-up detector 330 to better distinguish between bits on the bus, to identify the start of a message frame, and to distinguish between different blocks within a message frame (for example, a CAN message frame consists of an identifier field, a data length code, a data field, a CRC checksum) as non-limiting examples.

In order to detect the data rate, the transceiver 300 can simply measure the time between two or more transitions of data received at the TXD pin 308. This can be a multiple number of bits. Since the transceiver 300 can identify this message using the selective wake-up detector 318, it also knows how many bits were transmitted between the transitions. With this information the transceiver 300 is able to calculate the length of a bit related to its own oscillator.

It will be appreciated that clock recovery is a well-known technology, and therefore particular details of the implementation of the data rate detector 330 are not necessary in this document.

The embodiment of FIGS. 5 to 7 can provide an advantage in that complex clock recovery hardware to identify the data rate from signals received from the data bus pin 306 may not be required, and this can be because the data rate can be more readily determined from signals received at the device-side of the transceiver 300, without complex recovery circuits for processing signals received at the network-side of the transceiver 300.

It will also be appreciated that accurately determining the timing information of data received at the transmit pin 308 (TXD) can enable subsequent data received from the network at the data bus pin 306 during the second mode of operation to be more accurately and conveniently decoded using the more robust timing information.

As indicated above, it will be appreciated that different types of control pins can be used with embodiments of the invention, and that the invention is not limited to use of STBN and EN pins or any other type of control pins.

FIG. 8 shows schematically a process flow according to an embodiment of the invention. The process flow relates to the operation of a transceiver having a transmit pin and a receive pin for connecting to a device, and a bus pin for connecting to a network.

The process flow begins at step 802 by connecting the transmit pin to a wake-up detector of the transceiver. In this way, signalling received at the transmit pin can be monitored by the wake-up detector in order to activate a wake-up code at step 804. Activating the wake-up code can involve identifying one of a plurality of wake-up codes stored in memory associated with the wake-up detector in accordance with the received signalling.

Steps 802 and 804 can be considered as being performed in a first mode of operation 812 in which the wake-up detector is being configured. In additional embodiments, timing parameters of the transceiver can also be configured during the first mode of operation 812, for example as described with reference to FIGS. 5 to 7 above.

Step 806 comprises connecting the bus pin to the wake-up detector, and optionally disconnecting the transmit pin from the wake-up detector. At step 808, the wake-up detector is monitoring signalling received at the bus pin in order to identify data/signals representative of the wake-up code that was activated at step 804.

Steps 806 and 808 can be considered as being performed in a second mode of operation 814 in which signals on a network can be monitored for data representative of a selective wake-up instruction for waking up the device associated with the transceiver.

Step 810 includes connecting both the transmit pin and receive pin to the bus pin so that the transceiver can communicate signals between a device and network in the normal way. That is, the device is brought out of sleep mode.

The invention claimed is:

1. A transceiver comprising:
   a transmit pin configured to receive a signal from a microcontroller;
   a receive pin configured to transmit a signal to a microcontroller;
   a bus pin configured to transmit and receive signalling to/from a network;
   a wake-up detector for selectively waking up the microcontroller connected to the transceiver; and
   wherein the transceiver includes one or more switches operable to put the transceiver in a first mode of operation;
   wherein, in the first mode of operation, the transmit pin is connected to the wake-up detector, and the wake-up detector is configured to activate a wake-up code in accordance with a signal received at the transmit pin and upon activation of the wake-up code, the transceiver is configured to monitor the bus pin for a selected wake-up code and when the selected wake-up code is received and matches the activated wake-up code, the transceiver is configured to perform a wake up operation on the microcontroller.

2. The transceiver of claim 1, wherein the one or more switches are further operable to put the transceiver in a second mode of operation, and, in the second mode of operation:
   the wake-up detector is connected to the bus pin; and
   the wake-up detector is configured to monitor signalling received at the bus pin in order to identify the activated wake-up code.

3. The transceiver of claim 2, wherein the wake-up detector is configured to cause the transceiver to enter a third mode of operation upon identifying the activated wake-up code;
   wherein, in the third mode of operation, the transmit pin and receive pin are both connected to the bus pin.

4. The transceiver of claim 3, wherein the transceiver is configured to change from the third mode of operation to the first or second mode of operation upon receipt of a "go to sleep" signal.

5. The transceiver of claim 1, wherein, in the first mode of operation, the transmit pin is not connected to the bus pin.

6. The transceiver of claim 1, wherein the transceiver is configured to change from the first mode of operation to a second mode of operation after a wake-up code has been activated.

7. The transceiver of claim 1, further comprising a data rate detector and an oscillator, wherein, in the first mode of operation, the data rate detector is configured to process a signal from the transmit pin and a signal from the wake-up detector and generate a timing signal that is configured to adjust one or more parameters of the oscillator in accordance with the signal received at the transmit pin.

8. The transceiver of claim 1, wherein the transmit pin, receive pin and bus pin are standard pins.

9. The transceiver of claim 1, wherein, in the first mode of operation, the transmit pin is connected to the receive pin.

10. The transceiver claim 1, wherein, in the second mode of operation, the transmit pin is not connected to the wake-up detector.

11. The transceiver of claim 1, wherein the wake-up detector is configured to activate a wake-up code by identifying a wake-up code in memory that corresponds to a wake-up code represented by the signal received at the transmit pin.

12. An integrated circuit comprising the transceiver of claim 1.

13. A network comprising:
   one or more devices;
   a transceiver connected to the one or more devices; and
   a data bus connecting the one or more transceivers;
   wherein the transceiver/s are according to claim 1, and the transmit and receive pins of the transceiver are connected to one of the devices and the bus pin is connected to the data bus.

* * * * *